United States Patent
Villefrance et al.

(10) Patent No.: US 7,313,136 B2
(45) Date of Patent: Dec. 25, 2007

(54) METHOD AND SYSTEM ESTABLISHING A DATA LINK LAYER PROTOCOL ON A I²C™ PHYSICAL LAYER CONNECTION

(75) Inventors: Rasmus Villefrance, Helsingoer (DK); Jesper Sandberg, Valby (DK)

(73) Assignee: Nokia Corporation, Espoo (FI)

( * ) Notice: Subject to any disclaimer, the term of this patent is extended or adjusted under 35 U.S.C. 154(b) by 933 days.

(21) Appl. No.: 10/606,385

(22) Filed: Jun. 26, 2003

(65) Prior Publication Data

US 2004/0264453 A1 Dec. 30, 2004

(51) Int. Cl.
*H04L 12/28* (2006.01)
(52) U.S. Cl. .......................... 370/389; 710/9
(58) Field of Classification Search ........... 370/364, 370/365, 257, 438, 471; 710/36
See application file for complete search history.

(56) References Cited

U.S. PATENT DOCUMENTS

| | | | | |
|---|---|---|---|---|
| 5,572,528 A | * | 11/1996 | Shuen | 370/402 |
| 5,737,595 A | * | 4/1998 | Cohen et al. | 707/100 |
| 5,768,618 A | * | 6/1998 | Erickson et al. | 710/9 |
| 5,911,044 A | * | 6/1999 | Lo et al. | 709/203 |
| 6,134,665 A | | 10/2000 | Klein et al. | 713/300 |
| 7,093,040 B1 | * | 8/2006 | Mach | 710/100 |

OTHER PUBLICATIONS

"Internet Connectivity: Stacking the Odds in Your Favor", Embedded Systems Programming, Jack G. Ganssle, Jan. 1998, pp. 34-42, XP008036396.

"Encapsulation Service", Consultative Committee for Space Data Systems, CCSDS 133.1-R-1, (Online) Apr. 2002, pp. 1-32, XP002300031 Retrived from the Internet: URL:http://ssdoo/gsfc.nasa.gov/nost/wwwcla ssic/rpa210/CCSDS-133.1-R-1.pdf.

"Computer Networks, The Data Link Layer", Computer Networks, London:Prentice-Hall International, GB, 1996, pp. 175-242, XP002271205 ISBN: 0-13-394248-1.

"The I2C-bus specification Version 2.1" Philips Semiconductors. Product Specification, XX, XX, Jan. 2000, pp. 1-46, XP002218697.

\* cited by examiner

*Primary Examiner*—Edan Orgad
*Assistant Examiner*—Lawrence J Burrowes
(74) *Attorney, Agent, or Firm*—Perman & Green, LLP (57) ABSTRACT

This invention relates to a method for establishing a data link layer connection enabling data communication between a plurality of modules in a system connected to an I²C™-bus. The modules may be a mobile communication device such as a cell or mobile telephone, and peripherals such as a functional cover, a camera or the like. In addition, this invention relates to a data package configured according to the I²C™ specification and according to a data link layer protocol.

20 Claims, 4 Drawing Sheets

METHOD AND SYSTEM ESTABLISHING A DATA LINK LAYER PROTOCOL ON A I²C™ PHYSICAL LAYER CONNECTION

FIELD OF THE INVENTION

This invention relates to a method for establishing a data link layer connection enabling data communication between a plurality of modules in a system connected to an I²C™-bus. The modules may be a mobile communication device such as a cell or mobile telephone, and peripherals such as a functional cover, a camera or the like. In addition, this invention relates to a data package configured according to the I²C™ specification and according to a data link layer protocol.

BACKGROUND OF THE INVENTION

The I²C™-bus specification published by Philips Semiconductors (I²C™ is Philips trademark) and incorporated herein by reference, is a de facto world standard for providing the physical layer for data communication between a plurality of connected integrated circuits (ICs). The I²C™-bus supports any IC fabrication process and comprises a first wire for carrying serial data (SDA) and a second wire for carrying a serial clock (SCL). The ICs connected to the I²C™-bus are each recognized by a unique address and depending on operation of each of the ICs they may act as transmitters or receivers on the I²C™-bus. The connected ICs may act as slaves or masters, where a master determines when to communicate to a slave, and where the master determines when the slave is to communicate with the master.

Figure 1A:
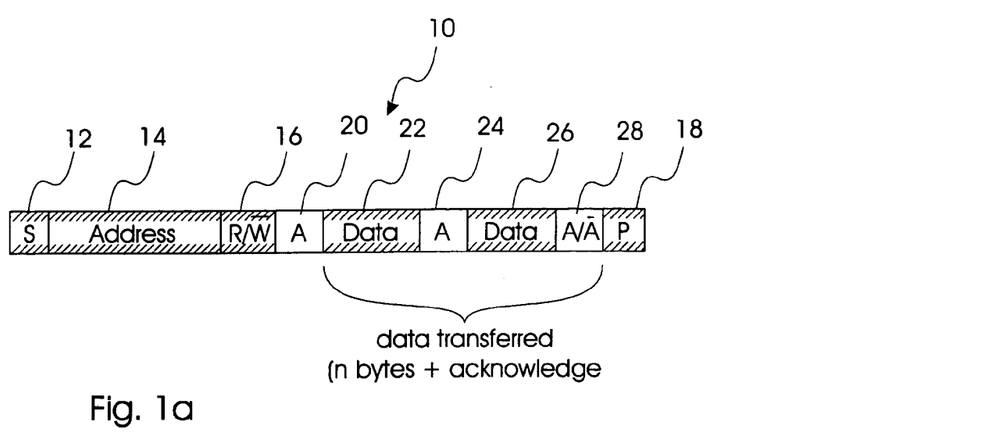
FIGS. 1a and 1b, show the prior art I²C™ specified configuration of data to be transferred on a I²C™-bus.

The I²C™-bus specification specifies a data frame 10, as shown in FIG. 1a, for communicating data on the I²C™-bus, which data frame requires a "start condition" 12 prior to transmission on the I²C™-bus and consisting of a 7-bit "address" 14 of the receiving IC. The address 14 is followed by a data direction bit 16, where a "0" indicates "WRITE" and a "1" indicates "READ", and the data frame 10 is terminated by a "stop condition" 18. Subsequent to receiving the data direction bit 16 the I²C™ specification requires the data receiving IC to acknowledge reception of the address 14 and the data direction bit 16 by forwarding an acknowledgement bit 20, accomplished by pulling the first wire of the I²C™-data bus "0". Following reception of the acknowledgement bit 20 the data transmitting IC initiates transmission of data 22. Transmission of each data byte is followed by further acknowledgement bits from the data receiving IC, shown in FIG. 1a as acknowledgement bit 24 and data 26. Finally, the last data byte 26 is acknowledged by a final acknowledgement bit 28.

Figure 1B:
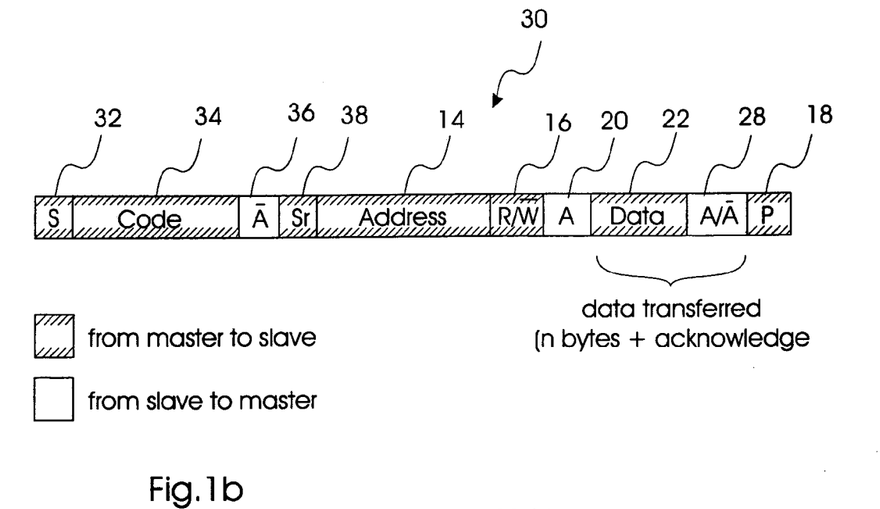

In high speed transfer mode a data frame 30, as shown in FIG. 1b, further comprises a further "start condition" 32, an 8-bit "code" 34 and a "not-acknowledgement bit" 36 preceding a "start condition" 38, which replaces the "start condition" 12 described above. In addition, in high speed transfer mode the data bytes are only acknowledged following transmission of the last data byte.

The "stop condition" 18 may be substituted by a further "start condition" 38, so as to allow for a series of data to be forwarded to a plurality of IC slaves and/or masters in one particularly defined mode.

The I²C™-bus provides means for establishing exchange of data in a wide variety of electronic equipment, however, the I²C™-bus specification fails to provide specifications for linking of various types modules of an electronic system having different transport layer requirements. Hence, whenever data is to be transferred over the I²C™-bus there is a need for establishing compatibility between old and added new modules, or modules using different transport layer protocols. That is, when a new set of electronic modules are to be connected with an existing electronic system utilising an I²C™-bus operating in accordance with a first set of data exchange rules the new set of electronic modules is required to communicate in accordance with the first set of data exchange rules when communicating with the existing electronic modules. Thus a series of sets of data exchange rules is required or, alternatively, the oldest set of data exchange rules determines which should be used thereby severely limiting further developments.

SUMMARY OF THE INVENTION

An object of the present invention is to provide a method and system for solving the above mentioned problems and shortcomings of the prior art I²C™ specifications, and to provide a data link layer protocol providing backward and forward compatibility in an I²C™-bus type network.

Further, the object of the present invention is to provide a data link layer protocol enabling data communication between modules using a wide variety of transport layer protocols and connected to an I²C™-bus.

A particular advantage of the present invention is provision of data package within the I²C™ data frame, which data package may carry any kind of transport data on the I²C™-bus.

A particular feature of the present invention relates to the fact that the data link layer protocol according to the present invention does not require any particular I²C™ running "mode" on the I²C™-bus.

The above objects, advantage and feature together with numerous other objects, advantages and features, which will become evident from below detailed description, are obtained according to a first aspect of the present invention by a system for providing data communication between a plurality of electronic modules connected to an I²C™-bus, wherein said plurality of electronic modules each are adapted to communicate a data package comprising in a layered structure a physical layer complying with I²C™ specifications, a data link layer comprising first header field for data payload type and a second header field for a data link layer version, and a network/transport layer comprising a third header field for a transmitting electronic module's address, a fourth header field for a length of said data package, and comprising data payload.

By adding further layers onto the I²C™ physical layer data frame significant advances may be accomplished. By packaging the payload to be transferred on the I²C™-bus with an additional header section containing data for further layers in a reference model a structured approach is achieved, in which a data package may comprise data configured according to a wide variety of payload types (according to protocols) which may be appropriately identified by the receiving module. That is, the system enables various electronic modules utilising a plurality of protocols to be connected to the I²C™-bus thereby enabling forward and backward compatibility.

The term communicate is in this context to be construed as receiving or transmitting a data package in any configuration for example a master/slave configuration.

Further, the term first, second and so on are in this context to be construed as a identifying number and not as a physical position on a time line per se.

Nevertheless, the term should be construed to encompass a position on a time line.

In addition, the term data package is in this context to be construed as a datagram or a data packet, i.e. a package to be communicated through a network connection such as a bus, which package generally comprises a header section and a payload section together with a termination section. The information contained in the header section may be interpreted as a series of layers, where the term layered structure in this context is to be construed as a reference model such as open systems interconnection (OSI), where the main idea is that the process of communication between two end points in a network can be divided into layers, with each layer adding its own set of special, related functions.

The electronic modules according to the first aspect of the present invention may comprise a mobile communication device such as a cell, mobile or satellite telephone, a personal digital assistant, or peripherals thereto. The term module, however, is in this context to be construed broadly as an electronic element such as an integrated circuit (IC) or as a group of integrated circuits.

The data payload type according to the first aspect of the present invention may comprise OBEX (device independent communication protocol that allows data to be shared between devices), TCP (Transmission control protocol), IP (Internet protocol), HTTP (Hypertext transfer protocol), or any proprietary payload type. In fact, the system is as mentioned above backward as well as forward compatible and therefore further future types of payload types (protocols) may be incorporated in the system.

The data link layer version according to the first aspect of the present invention may comprise a major version, which is binary incompatible, and a minor version, which is binary compatible.

The data package according to the first aspect of the present invention may further comprise in said network/transport layer a fifth header field for an offset value for determination of data payload start in said data package. The offset value provides means for compensating for future changes to the network/transport protocols, since the receiving module through the offset value may jump directly to the payload start when the receiving module does not require the potential data from header.

The data package according to the first aspect of the present invention may further comprise in said network/transport layer a sixth header field prior to said data payload start in said data package for buffering. The sixth header field in the network/transport layer is particularly advantageous when the future extension of the header is to be incorporated. The offset value compensates for the potentially shifted start of the data payload.

The data package according to the first aspect of the present invention may further comprise a checksum field following the data payload. The checksum provides means for a processor to calculate whether the received data payload has been received correctly.

The data package according to the first aspect of the present invention may further comprise in said network/transport layer a seventh header field for a data package number and may further comprise in said network/transport layer an eighth header field for a data package fragment sequence number. The data package number provides means for splitting data messages in a plurality of data packages and the data package fragment sequence number provides means for rejoining the split data messages into a particular order.

The above objects, advantages and features together with numerous other objects, advantages and features, which will become evident from below detailed description, are obtained according to a second aspect of the present invention by a data package for communicating between a plurality of electronic modules connected to an I²C™-bus, wherein said data package comprising in a layered structure physical layer data complying with I²C™ specifications, data link layer data in a first header field comprising data payload type and in a second header field comprising a data link layer version, and network/transport layer data in a third header field comprising a transmitting electronic module's address, in a fourth header field comprising a length of said data package, and comprising data payload.

The data package according to the second aspect of the present invention may incorporate any features of the system according to the first aspect of the present invention.

The above objects, advantages and features together with numerous other objects, advantages and features, which will become evident from below detailed description, are obtained according to a third aspect of the present invention by a receiver unit adapted to receive a data package according to the second aspect of the present invention.

The above objects, advantages and features together with numerous other objects, advantages and features, which will become evident from below detailed description, are obtained according to a fourth aspect of the present invention by a transmitter unit adapted to transmit a data package according to second the aspect of the present invention.

The above objects, advantages and features together with numerous other objects, advantages and features, which will become evident from below detailed description, are obtained according to a fifth aspect of the present invention by a method for establishing data communication between a plurality of electronic modules connected to an I²C™-bus, wherein said plurality of electronic modules each communicate a data package comprising in a layered structure a physical layer complying with I²C™ specifications, and wherein said method comprising providing in said data package in a data link layer a first header field for data payload type and a second header field for a data link layer version, providing in said data package in a network/transport layer a third header field for a transmitting electronic module's address and a fourth header field for a length of said data package, and providing in said data package a data payload.

The method according to the fifth aspect of the present invention may incorporate any features of the system according to the first aspect of the present invention, any features of the data package according to the second aspect of the present invention, any features of the receiver unit according to the third aspect of the present invention, and any features of the transmitter unit according to the fourth aspect of the present invention.

The above objects, advantages and features together with numerous other objects, advantages and features, which will become evident from below detailed description, are obtained according to a sixth aspect of the present invention by a computer program comprising code adapted to perform the following steps when said program is run in a data processor adapted to establish data communication between a plurality of electronic modules connected to an I²C™-bus, wherein said plurality of electronic modules each communicate a data package comprising in a layered structure having a physical layer complying with I²C™ specifications, and wherein said program providing in said data package in a data link layer a first header field for data payload type and a second header field for a data link layer version, providing in said data package in a network/transport layer a third header field for a transmitting electronic module's address and a fourth header field for a length of said data package, and providing in said data package a data payload.

The computer program according to the sixth aspect of the present invention may incorporate any features of the system according to the first aspect of the present invention, any features of the data package according to the second aspect of the present invention, and any features of the method according to the third aspect of the present invention.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawing, wherein.

DETAILED DESCRIPTION OF PREFERRED EMBODIMENTS

In the following description of the various embodiments, reference is made to the accompanying figures, which form a part hereof, and in which by way of illustration various embodiments are shown, in which the invention may be practiced. It is to be understood that other embodiments may be utilized and structural and functional modifications may be made without departing from the scope of the present invention.

The definition applied in the present description is a message may be configured as one or more data packages, where each data package comprise a data frame (physical layer) specifying low level communication rules, i.e. when to transmit information regarding who is the intended receiver of the data package and when to transmit actual data segments. The data segments may according to the preferred embodiment of the present invention further comprise a header section, a data payload section and a termination section. Nevertheless, generally the overall structure of a data package as such is thus a header section (including physical layer data and higher layer data), a payload section and a termination section, however, in this context when referring to a header section, the header section of the data segment is meant unless specifically stated otherwise.

Figure 1C:
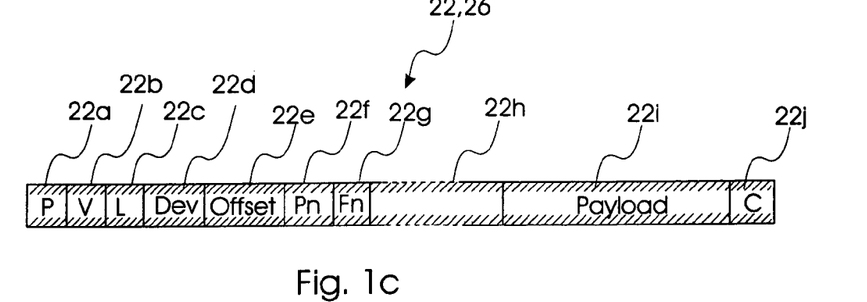
FIG. 1c, shows the preferred embodiment of a data package according to the present invention.

The preferred embodiment of the data package according to the present invention, shown in FIG. 1c, utilises the data frames 10, 30 of the I²C™ specification as a physical layer in a reference model. Thus the further layers relating to the present invention are incorporated into this data frames 10, 30 by structuring the data in the data segment(s) 22, 26. The data segment(s) 22, 26 carry the communication between electronic modules such as mobile communication devices and peripherals by packaging the data to be transferred in a format shown in table 1 below.

TABLE 1

Header used on I²C ™ media

| Size in bytes | Name | Comment |
| --- | --- | --- |
| 1 | I2C_PROTOCOL | Payload type. |
| 1 | I2C_VERSION | I²C ™ Data Link Protocol version. |
| 2 | I2C LENGTH | Length of the whole I²C ™ data packet |
| 1 | I2C_DEVICE | Sender's I²C ™ device number. |
| 1 | I2C_OFFSET | Payload start address |
| n | extensions | For extensions |
| ... | I2C_DATA | Payload, as defined in "PROTOCOL" |
| 1 | Checksum | Calculated checksum |

In case the data amount of a message exceeds the data frame limit further information is incorporated into the header section.

As shown below in table 2 and in FIG. 1c, in case splitting a message is required, the header is further incorporated with a data package number and a data fragment number so as to enable the receiving electronic module to identify the correct order, in which the message is to be reassembled.

TABLE 2

Header used on I²C ™ media

| Size in bytes | Name | Comment |
| --- | --- | --- |
| 1 | I2C_PROTOCOL | Payload type. |
| 1 | I2C_VERSION | I²C ™ Data Link Protocol version. |
| 2 | I2C LENGTH | Length of the whole I²C ™ data packet |
| 1 | I2C_DEVICE | Sender's I²C ™ device number. |
| 1 | I2C_OFFSET | Payload start address |
| 2 | I2C_PACKET_NO | For message splitting. |
| 2 | I2C_FRAGMENT_NO | For message splitting. |
| n | extensions | For extensions. |
| ... | I2C_DATA | Payload, as defined in "PROTOCOL". |
| 1 | Checksum | Calculated checksum |

I2C_PROTOCOL 22a

This field describes which protocol is used for a message to be communicated on the I²C™-bus. Three protocols are at present defined: I2C_NEG for negotiation protocol for data link layer protocol settings, I2C_OBEX for OBEX-type messaging. Additionally, TCP/IP, HTTP, and/or any product proprietary protocols may be coded.

I2C_VERSION 22b

This field describes the version of the header section. It should be noted that this is not the version of the protocol used for the data packages. The version is transmitted in XXX.YYY format, where XXX is the major version (binary incompatibility) and YYY is the minor version (changes which is binary compatible). For example, if the first octet of I2C_VERSION is "0", the following conditions apply initially: transmission speed is 100 kbps, I²C™ mode is single master, and the checksum is calculated from the least significant byte of the sum of all previous byte-fields from I2C_PROTOCOL and onwards. If the second octet of I2C_VERSION is different from "0", the above mentioned conditions still apply.

I2C_Length 22c

This field contain the length of the whole data package.

I2C_DEVICE 22d

This field comprises the I²C™ address of the electronic module which is sending the data package. This field is necessary when sending data packages over the I²C™-bus, since the I²C™ specification does not include this. It is necessary to know which electronic module the data package came from, in order to send a response back to the transmitting electronic modules.

I2C_OFFSET 22e

This field contains an offset in bytes of where the payload data starts in the data package. Alternatively, the offset field comprises an address for the payload data start in the data package. This field is incorporated in the header section to make the header backward compatible. When future fields are added to the header, any software can forward payload data even though the software is aware of the additional fields, since the software may forward the data package based on the OFFSET and the VERSION field.

I2C_PACKET_NO 22f

For transport protocol messages that have been split up into several data link protocol messages, this field determines which transport protocol message the data link fragment belongs to.

I2C_FRAGEMENT_NO 22g

For transport protocol messages that have been split up into several data link protocol messages, this field determines the sequence number of the fragment.

For Extensions 22h

This field is intended for compensating for future extensions of the header section. There might be a need in the future for additional fields in the header. These extensions can be added while still be backward compatible, the OFFSET field will tell the receiving entity where the actual data package starts.

I2C_DATA 22i

This field contains the actual payload. This could e.g. be an OBEX message, an IP package or any other package format.

Checksum 22j

The checksum is calculated as a the least significant byte of the sum of all previous byte fields in the message frame, from I2C_PROTOCOL field and onwards.

EXAMPLE

The present invention is below described by way of example, in which a mobile communication device communicates with a functional cover through an I²C™-bus and utilising the data link layer structure as described above.

Figure 2:
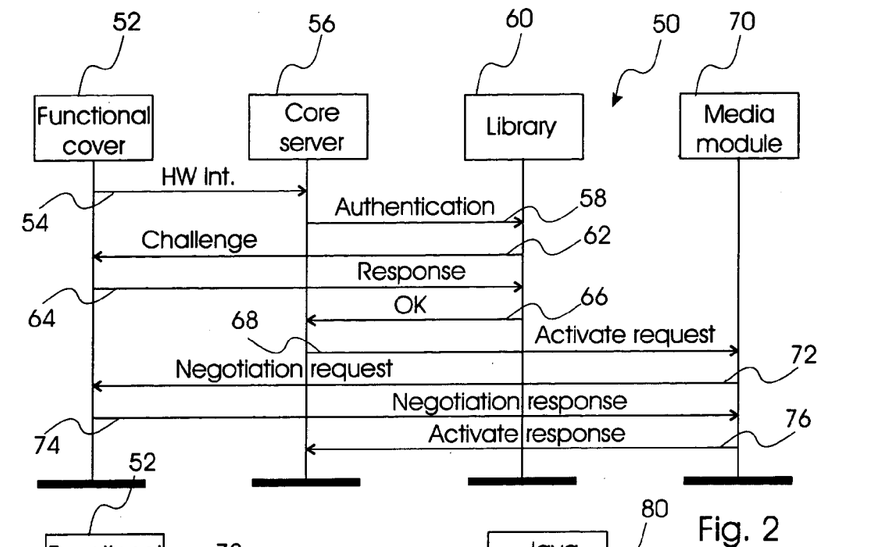
FIG. 2, shows data link layer establishing communication for a functional cover and a mobile communication device.

FIG. 2, shows data link layer establishing communication for a functional cover 52 and a mobile communication device, which communication is designated in entirety by reference number 50.

The functional cover 52 is a component that complies to the operating system of the mobile communication device, however, it is not designed or maintained by the operating system.

The functional cover 52 controls the start up and shut down of the functional cover's 52 functionality, it provides information to a java server about location of information etc. depending on the actual application implemented. The Java server provides means for starting from the applications menu midlets, which are standardized Java code modules that run in a mobile communication device. In addition, the Java server provides means for performing notification of registration of a functional cover to be contacted when a connection is required, and means for storing connection identification such as device identification (devID) and object identification (objID) to be used in conjunction with managing the connection.

The midlet may for example be a global positioning system (GPS) midlet showing a user GPS. It should be noted that the GPS midlet is not part of the operating system software of the mobile communication device.

The GPS midlet is "the brain" of a GPS functional cover feature. After the connection has been set up (i.e. all layers below the application layer are ready), the midlet is the only entity in the mobile communication device that makes decisions and controls what should happen.

The GPS midlet is stored in the mobile communication device's file system similarly to a midlet downloaded from over-the-air (OTA) facilities or uploaded using PC Suite.

When the functional cover 52 is connected to a mobile communication device a hardware interrupt is registered in a core server 56, due to the functional cover 52 causing 54 an interrupt signal.

The core server 56 handles low-level functional cover specific issues such as attachment interrupt, power-up, connector glitches, mobile communication device sleep, functional cover sleep, and reset handling.

The core server 56 comprises all I²C™ proprietary information, such as address ranges for different electronic modules or chips and broadcasts information relating to connected I²C™ electronic modules.

The core server 56 requests 58 authentication of the functional cover 52 from a library 60, which, subsequently, challenges 62 the functional cover 52. If the challenge 62 is responded 64 appropriately the library 60 forwards 66 an OK-signal to core server 56, after which the core server requests 68 activation from a media module 70.

The media module 70 is able to determine what I²C™ electronic modules are connected to the I²C™-bus, upon request from the core server 56.

The media module 70 implements the data link layer protocol and may handle more than one I²C™ hardware port.

The media module 70 negotiates with the functional cover 52 through communicating of a negotiation request 72 and receiving a negotiation response 74. Finally, the media module 70 forwards 76 a activation response to the core server 56.

Figure 3:
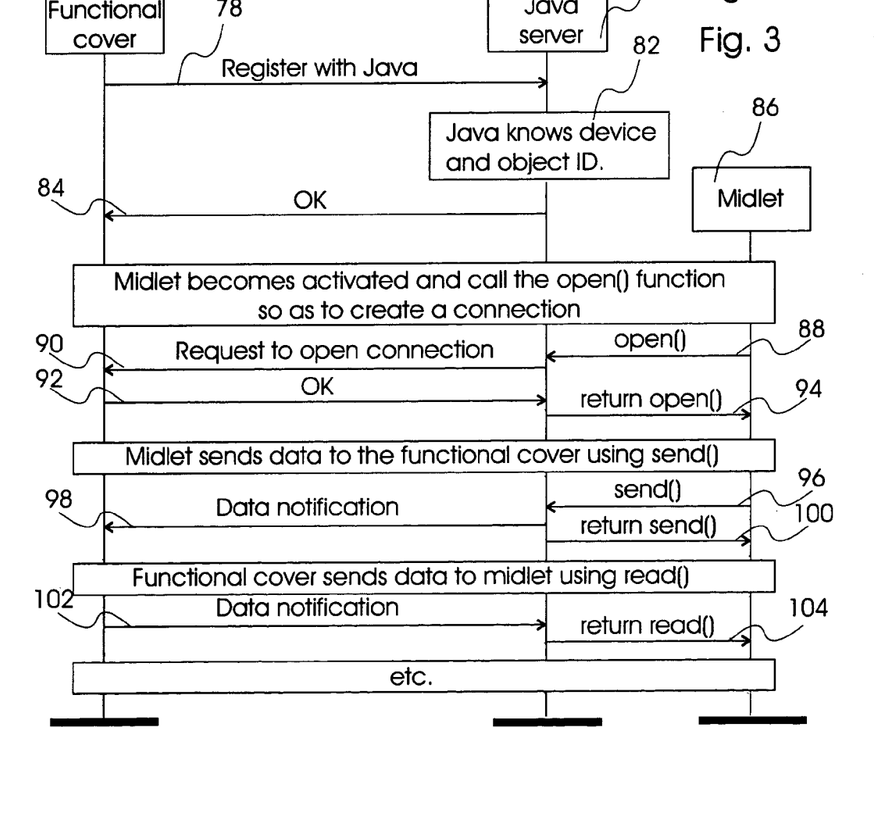
FIG. 3, shows an application layer communication, first connection establishment, then two examples of communication.

FIG. 3, shows an application layer communication, first connection establishment, then two examples of communication. Immediately following the establishment of the data link layer, as described with reference to FIG. 2, the functional cover 52 forwards 78 a registration signal comprising device identification and object identification to a Java server 80. The Java server 80 registers the device and object identification during step 82 and forwards 84 an OK-signal to the functional cover 52.

At some point a midlet 86 is activated in the mobile communication device and the midlet 86 requests 88 an open( )-function of the Java server 80. The Java server 80 requests the functional cover 52 to open a connection by forwarding 90 a request signal. When the functional cover 52 provides 92 an OK-signal to the Java server 80, the Java server 80 returns 94 the open( )-function to the midlet 86.

Now the midlet 86 may transmit data to the functional cover 52, by requesting 96 utilisation of a send( )-function from the Java server, which forwards 98 a data notification comprising a message to the functional cover 52 and returns 100 the results of send( )-function to the midlet 86.

The functional cover 52 may send data to the midlet 86, which uses a read( )-function of the Java server 82 to receive the data. The functional cover 52 forwards 102 a data notification to the Java server 80, which data notification is read 104 by the midlet 86. This process may carry on for any number of cycles until all data required has be fully exchanged between the midlet 86 and the functional cover 52.

Figure 4:
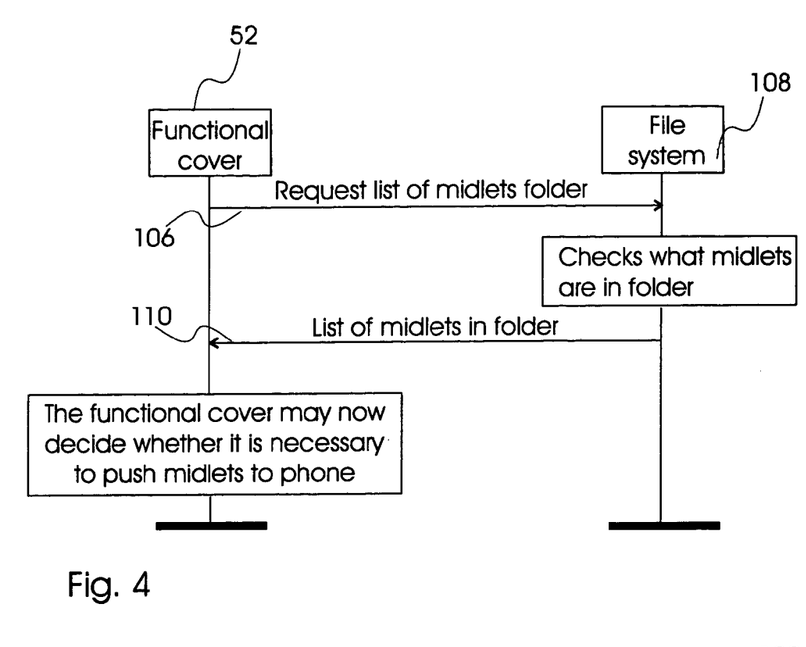
FIG. 4, shows how the functional cover checks which midlets are installed on the mobile communication device.

FIG. 4, shows how the functional cover 52 checks which midlets are installed on the mobile communication device. The functional cover 52 requests 106 a file system 108 for a list of midlets in a particular folder. The file system 108, subsequently, checks what midlets are in the particular folder and forwards 110 a list of midlets to the functional cover 52. The functional cover 52 may now decide whether it is necessary to push midlets to the mobile communication device.

Figure 5:
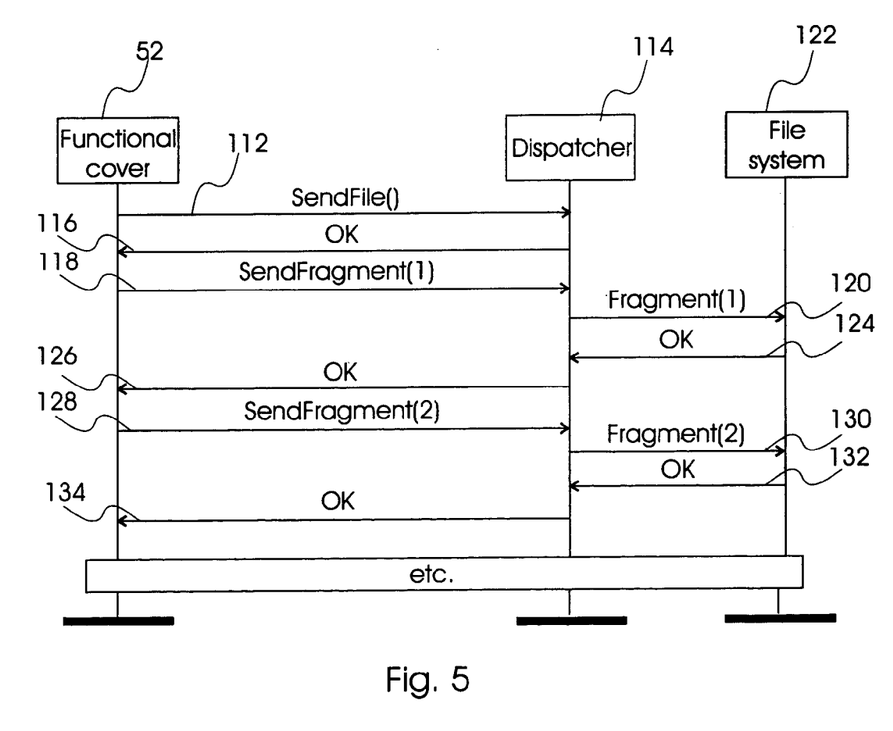
FIG. 5, shows transmission of a midlet from the functional cover to a mobile communication device.

FIG. 5, shows transmission of a midlet from the functional cover 52 to a mobile communication device. The functional cover 52 forwards 115 a midlet to a dispatcher 114 by utilising a SendFile( )-function comprising information of mimetype and filename. The dispatcher 114 forwards 116 OK-signal to the functional cover 52 upon receipt of the SendFile instruction, where after the functional cover 52 initiates transmission of a file, which in the example shown in FIG. 5, comprises more than one fragment. The data package size determines when to utilise fragmentation procedures.

The functional cover 52 utilises 118 a SendFragment( )-function for forwarding the first fragment of the file, which fragment is forwarded 120 further by the dispatcher 114 to the file system 122. The file system 122 forwards 124 a first OK-signal to the dispatcher 114 upon safe receipt of the first fragment. Subsequently, the dispatcher 114 forwards 126 a first OK-signal to the functional cover 52, which upon receipt forwards 128 a second fragment of the file to the dispatcher 114. Similarly, the dispatcher 114 forwards 130 the second fragment to the file system 122. The file system 122 forwards 132 a second OK-signal to the dispatcher 114 upon safe receipt of the second fragment. Subsequently, the dispatcher 114 forwards a second OK-signal 134 to the functional cover 52.

Obviously, this process may continue in accordance with the size of the file to be transferred between electronic modules.

Figure 6:
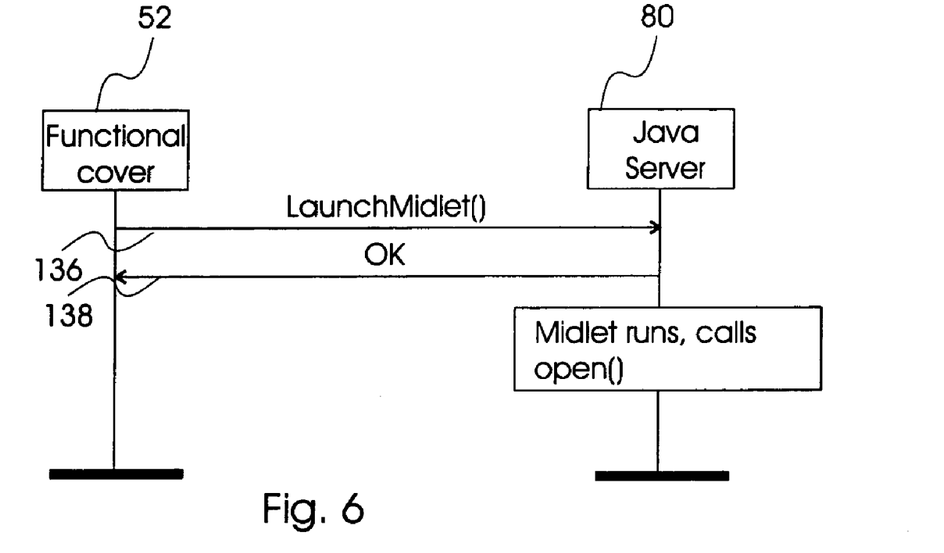
FIG. 6, shows how the functional cover starts a midlet without any user interaction.

FIG. 6, shows how the functional cover 52 starts a midlet without any user interaction. The functional cover 52 utilises 136 a function call, LaunchMidlet( ), of the Java server 80, which forwards 138 an OK-signal and executes the midlet by utilising the open( )-function.

Figure 7:
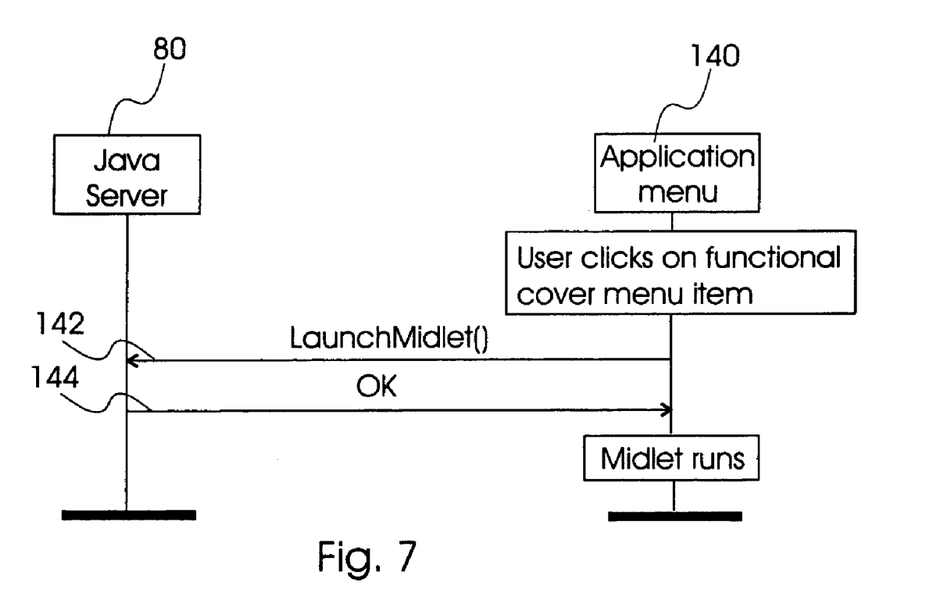
FIG. 7, shows how a user starts a midlet from an application menu.

FIG. 7, shows how a user starts a midlet from an application menu 140. A user clicks on a functional cover menu item and the application menu 140 utilises 142 a LaunchMidlet( )-function call of the Java server 80. The Java server 80 forwards 144 an OK-signal to the application menu 140, which, subsequently, executes the midlet.

What is claimed is:

1. A system for providing data communication between a plurality of electronic modules connected to an I²C™-bus, wherein the system comprises said plurality of electronic modules and said I²C™-bus; and wherein each of said plurality of electronic modules communicates, via said I²C™-bus, a data package comprising:

a layered structure having a physical layer complying with I²C™ specifications, a data link layer comprising first header field for data payload type and a second header field for a data link layer version, and a network/transport layer comprising a third header field for transmitting an electronic module's address, a fourth header field for a length of said data package, and comprising a data payload, and wherein information contained within said header fields provides compatibility among individual ones of said electronic modules operating under differing rules of data exchange.

2. A system according to claim 1, wherein said electronic modules comprise a mobile communication device consisting of a cell, mobile or satellite telephone, a personal digital assistant, or peripherals thereto.

3. A system according to claim 1, wherein said data payload type comprises OBEX, TCP, IP, HTTP, or any proprietary payload type.

4. A system according to claim 1, wherein said data link layer version comprises a major version, which is binary incompatible, and a minor version, which is binary compatible.

5. A system according to claim 1, wherein said data package further comprises in said network/transport layer a fifth header field for an offset value for determination of data payload start in said data package.

6. A system according to claim 1, wherein said data package further comprises in said network/transport layer a sixth header field, located prior to said data payload start in said data package, for buffering the data payload from other ones of the header fields.

7. A system according to claim 1, wherein said data package further comprises a checksum field following the data payload.

8. A system according to claim 1, wherein said data package further comprises in said network/transport layer a seventh header field for a data package number.

9. A system according to claim 1, wherein said data package further comprises in said network/transport layer an eighth header field for a data package fragment sequence number.

10. A method for formulating a data package for communicating between a plurality of electronic modules connected to an I²C™-bus, comprising:

providing the data package with a layered structure having physical layer data complying with I²C™ specifications, placing data link layer data in a first header field comprising data payload type, and inserting a second header field comprising a data link layer version, placing network/transport layer data in a third header field comprising a transmitting electronic module's address, inserting a fourth header field comprising a length of said data package, and providing a data payload, and wherein information contained within said header fields provides compatibility among individual ones of said electronic modules operating under differing rules of data exchange.

11. A method of formulating a data package according to claim 10 further comprising inserting in said network/transport layer a fifth header field for an offset value for determination of data payload start in said data package.

12. A method of formulating a data package according to claim 10, including a making of said data payload of a type comprising OBEX, TCP, IP, HTTP, or any proprietary payload type.

13. A method of formulating a data package according to claim 10 further comprising inserting in said network/transport layer a sixth header field, at a location prior to said data payload start in said data package, for buffering the data payload from other ones of the header fields.

14. A method of formulating a data package according to claim 10 further comprising inserting a checksum field following the data payload.

15. A method of formulating a data package according to claim 10 further comprising inserting in said network/transport layer a seventh header field for a data package number.

16. A method of formulating a data package according to claim 10 further comprising inserting in said network/transport layer an eighth header field for a data package fragment sequence number.

17. A receiver unit for receiving a data package formulated according to claim 10, wherein the receiver unit comprises at least one module of a plurality of electronic modules and a I$^2$C™-bus that interconnects the modules of said plurality of electronic modules, and wherein each of said plurality of electronic modules communicates via said I$^2$C™-bus.

18. A transmitter unit for transmitting a data package formulated according to claim 10, wherein the transmitter unit comprises at least one module of a plurality of electronic modules and a I$^2$C™-bus that interconnects the modules of said plurality of electronic modules, and wherein each of said plurality of electronic modules communicates via said I$^2$C™-bus.

19. A method for establishing data communication between a plurality of electronic modules connected to an I$^2$C™-bus, wherein said plurality of electronic modules each communicate a data package comprising a layered structure having a physical layer complying with I$^2$C™-bus specifications, and wherein said method comprises:

providing in said data package, in a data link layer, a first header field for data payload type and a second header field for a data link layer version, providing in said data package, in a network/transport layer, a third header field for a transmitting electronic module's address and a fourth header field for a length of said data package, and providing in said data package a data payload for establishing data communication between a plurality of said electronic modules, and wherein information contained within said header fields provides compatibility among individual ones of said electronic modules operating under differing rules of data exchange.

20. A server of a computer program, wherein the computer program comprises code performing the following steps when said program is run in a data processor adapted to establish data communication between a plurality of electronic modules connected to an I$^2$C™-bus, wherein said plurality of electronic modules each communicate a data package comprising:

a layered structure having a physical layer complying with I$^2$C™ specifications, and wherein said program provides in said data package in a data link layer a first header field for data payload type and a second header field for a data link layer version, provides in said data package in a network/transport layer a third header field for a transmitting electronic module's address and a fourth header field for a length of said data package, and provides in said data package a data payload, and wherein information contained within said header fields provides compatibility among individual ones of said electronic modules operating under differing rules of data exchange.

* * * * *